United States Patent [19]
Georgopoulos

[11] Patent Number: 5,306,054
[45] Date of Patent: Apr. 26, 1994

[54] FRANGIBLE APERTURE SEAL

[75] Inventor: George Georgopoulos, Pine Brook, N.J.

[73] Assignee: E.J. Brooks Company, Newark, N.J.

[21] Appl. No.: 47,698

[22] Filed: Apr. 14, 1993

[51] Int. Cl.$^5$ .............................................. B65D 33/34
[52] U.S. Cl. .................................. 292/307 R; 292/251
[58] Field of Search ............... 292/251, 307 R, 308, 292/309

[56] References Cited

U.S. PATENT DOCUMENTS

| | | | |
|---|---|---|---|
| 816,007 | 3/1906 | Freschl | 292/307 R |
| 2,081,627 | 5/1937 | Heinrich | 292/307 R |
| 4,242,290 | 12/1980 | Handelsman et al. | 292/251 X |
| 4,262,946 | 4/1981 | Swisher | 292/307 R |
| 4,416,478 | 11/1983 | Canney | 292/307 R |

*Primary Examiner*—Richard E. Moore
*Attorney, Agent, or Firm*—William Squire

[57] ABSTRACT

A brittle thermoplastic molded cylindrical hollow hole seal has a top wall and a depending side wall. An annular external rib snap fits to an annular groove in a hole side wall to secure the seal in place. Axially extending angularly shaped in cross section grooves are on the side wall interior and spaced axially extending slots pass through the side wall. The top wall internally has an eight point star shaped set of ridges and troughs whose points terminate at the side wall forming the interior grooves. Reflective aluminum flakes are in the material to provide a spotty finish. The slots, grooves, ridges and troughs form weakening regions causing the seal to shatter in response to an applied local pressure, for example, exerted by a screw driver for use with a screw plugged by the seal. The spotty appearance is difficult to hide when the seal is broken.

24 Claims, 1 Drawing Sheet

FRANGIBLE APERTURE SEAL

FIELD OF THE INVENTION

This invention relates to seals, and more particularly, to seals which seal an aperture such as a screw hole and the like for providing tamper indication.

BACKGROUND OF THE INVENTION

Tamper indicating devices for indicating tampering with a screw or the like recessed in a hole are known. One such device comprises a plug which includes a circular cylindrical wall having a transverse wall central between the ends of the cylindrical wall. An annular ridge aligned in the plane of the transverse wall engages an annular groove in the aperture side for retaining the plug in the aperture. This plug requires a tool for breaking and entering the transverse wall and for removing the device. This is undesirable because the plug may be removed and then reinserted into the aperture. The transverse wall, because it is recessed in the aperture is difficult to observe as having been tampered with.

SUMMARY OF THE INVENTION

An aperture seal is provided according to the present invention for indicating access to a cylindrical aperture of a given transverse shape and axial extent, the aperture having an interior side wall. The seal comprises a cylindrical body having a peripheral side wall the given transverse shape dimensioned to be received in and frictionally retained in the aperture in an axial direction and transverse wall means secured to the body side wall for enclosing the aperture, the body comprising frangible means such that the body breaks into a plurality of pieces in response to a localized pressure.

IN THE DRAWINGS

DETAILED DESCRIPTION OF THE PREFERRED EMBODIMENT

Figure 1:
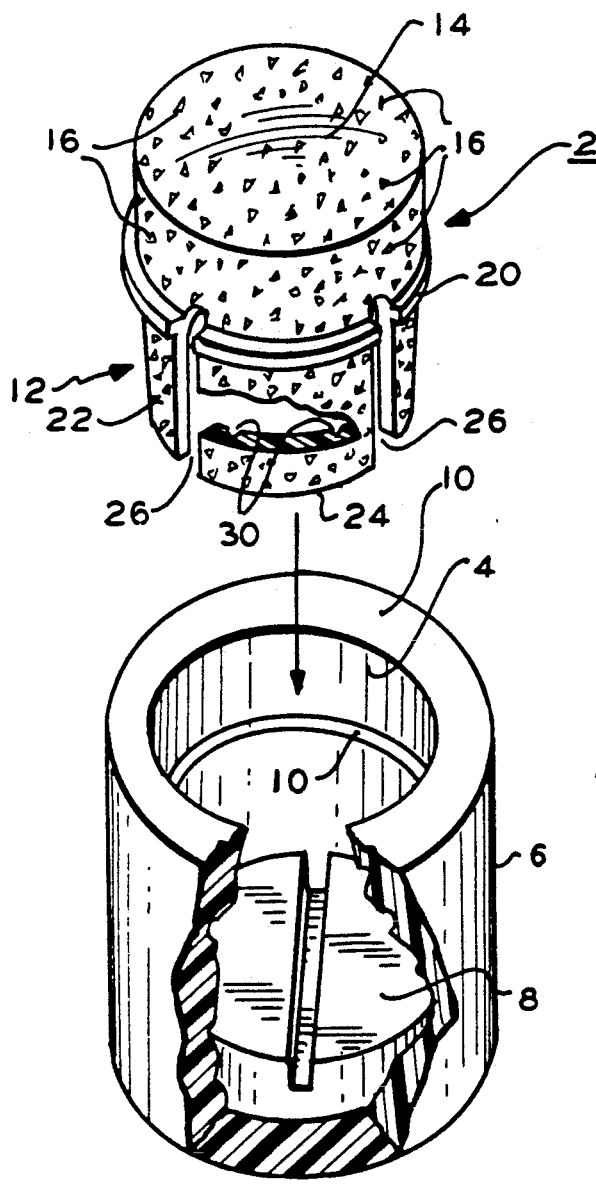
FIG. 1 is an isometric exploded view of an aperture seal according to one embodiment of the present invention.

In the Figures, aperture seal 2 serves to plug a hole 4 in a structure 6, typically used with utility meters or other devices desired to protect from unauthorized entry. The seal 2 prevents unauthorized access to a screw 8 in the hole 4, for example.

The hole 4 is a circular cylinder having an annular groove 10 in a side surface thereof. The screw 8 is located in the hole 4 distal the egress end 10 of the hole.

The seal 2 comprises molded thermoplastic material which is frangible and breaks easily in response to a local pressure. Seal 2 has a circular in transverse section side wall 12 depending from a convex top wall 14. Preferably the seal is transparent or translucent material, which contains metallic flakes 16 visible externally the seal. The flakes give the seal a spotted appearance which provides evidence of tampering if the seal is broken and the seal is then painted over to conceal the break. The paint will give the seal an obviously visible indication of tampering because it is believed the spotted appearance is difficult to duplicate with a paint.

Figure 3:
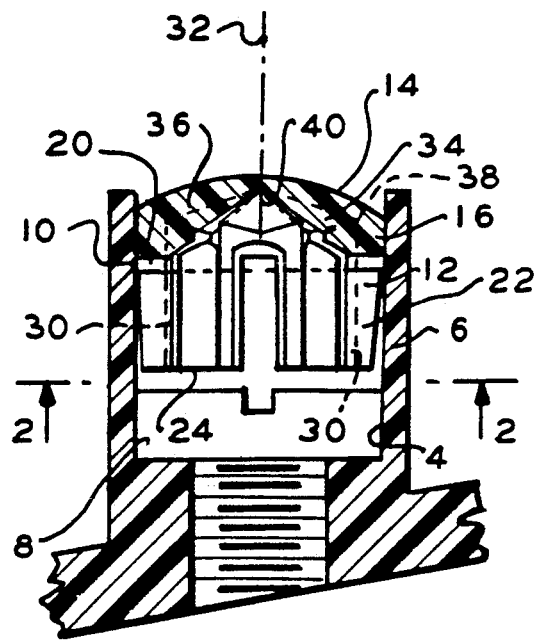
FIG. 3 is an elevation view of the seal of the embodiment of FIG. 1.

The top wall 14 may be spherical or other shapes. The side wall is of sufficient length such that the seal 2 is completely within the hole 4 such that only the top wall 14 is exposed to the ambient atmosphere. The side wall 12 has a circular cylindrical transverse section 16 at a region adjacent to the top wall 14. Portions of side wall 12 section 16 also form part of the top wall 14 as seen in FIG. 3. An external annular rib 20 extends around the periphery of wall 12 defining an end of section 16 distal the top wall 14. The remaining portion of wall 12 depending from rib 20 forms lower section 22.

Figure 2:
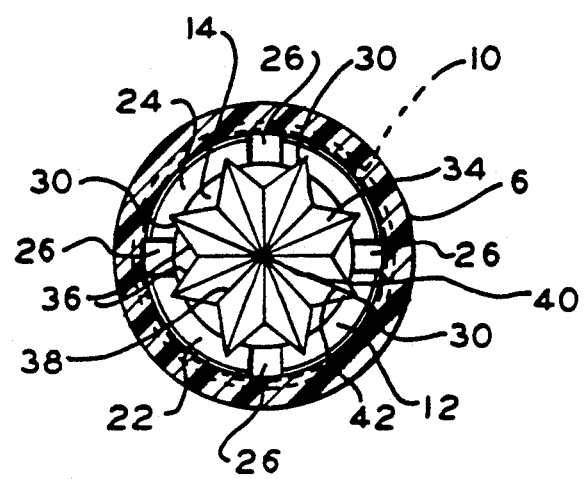
FIG. 2 is a transverse sectional view looking toward the top of the seal of FIG. 1.

Section 22 has a decreasing wall thickness in a direction toward edge 24 formed by a truncated conical external surface which narrows to its smallest diameter at edge 24. The internal surface of wall 12 is a circular cylinder. Four axially extending slots 26 through the wall 12 section 22 extend from edge 24 through the rib 20 into section 16. A plurality of longitudinal angular in transverse section grooves 30 are formed in the inner surface of wall 12 in the axial direction, axis 32. The grooves 30 are equidistant about the side wall 12 and extend from edge 24 into the top wall 14 as best seen in FIG. 2. The grooves 30 extend approximately 50% into the wall 12. The extent of this depth is sufficient to permit the wall 12 to break at stress points created by the grooves 30. There are in this embodiment two grooves 30 in each section 22 portion between slots 26. In FIG. 2, the grooves 30 are the apices of an eight point star shaped surface configuration 34 formed in the top wall 14.

Configuration 34 is a three dimensional eight point star comprising radially extending ridges 36 and troughs 38 between adjacent ridges 36. The ridges 36 and troughs 38 emanate from a common point 40 on axis 32. The radially distal ends of the crests of the ridges 38 relative to axis 32 are joined to the radially distal ends of the roots of the troughs 38. These ends terminate at wall 12 and continue into wall 12 forming the grooves 30.

The troughs 38, grooves 30 and slots 26 weaken the seal top wall 14 and side wall 12. A localized pressure exerted by a conventional screw driver, for example, on the top wall 14, fractures the seal 2 into a multitude of pieces created by stresses at the weakened regions. These pieces are not readily reusable, the seal being effectively destroyed. Any attempt to glue the pieces together is readily visually apparent. Further, the pieces are sufficiently small so as to be readily removable from hole 4. If for example the structure 6 is portable and can be manipulated, it can be inverted so the pieces can fall from the hole 4 by the force of gravity.

The rib 20 engages the hole 4 groove 10 for resisting removal of the seal 2 from the hole. In the alternative, close fit of the seal to the interior wall of the hole sufficient to provide tight frictional engagement so the seal can not fall out of the hole 4 by the force of gravity is sufficient to secure the seal in the hole. The seal is pushed into the hole 4 manually so the rib 20 and groove 10 snap fit together due to the natural resiliency of the thermoplastic material forming the seal 2. Thus, the seal being tightly engaged in the hole 4, is readily removed by fracturing the seal with the same tool used to remove the screw 8. No special tooling is required and the seal can no longer be reused. This provides obvious tamper evidence of unauthorized screw removal.

The material of the body forming the seal may be brightly colored, for example red or some other color and the aluminum flakes provide reflective elements in the material which give the seal a unique appearance. This appearance is such that any discontinuities due to a fracture are readily apparent and are not repairable in an unobtrusive manner.

It will occur to those of ordinary skill that various modifications to the disclosed embodiments may be made. It should be understood the scope of the present invention is defined in the appended claims, and not by the examples described, which are given by way of illustration and not limitation.

What is claimed is:

1. An aperture seal for providing tamper evidence indicating access to a cylindrical aperture of a given transverse shape and axial extent, said aperture having an interior side wall, said seal comprising:
   a cylindrical body having a peripheral side wall of said given transverse shape dimensioned to be received in and frictionally retained in said aperture in an axial direction, said body having a hollow core forming the body into a cup shaped ember comprising a side wall extending in said axial direction; and
   transverse wall means secured to the body side wall for enclosing said aperture, said transverse wall means comprising a top wall at an edge of the body side wall and transverse the axial direction, said body comprising frangible means such that the body breaks into a plurality of pieces in response to a localized pressure, said frangible means comprising forming the body of a frangible material and further comprising slots in said body side wall and undulations in said top wall.

2. The seal of claim 3 wherein said undulations and slots are in communication with the hollow core.

3. The seal of claim 1 wherein said frangible means further comprises forming at least the top wall with a plurality of weakened regions.

4. The seal of claim 3 wherein the weakened regions include radially extending ridges and grooves in said top wall.

5. The seal of claim 1 wherein said body is formed of molded thermoplastic including means for providing the body with a spotted appearance.

6. The seal of claim 5 wherein said means for providing the body with said spotted appearance includes forming the body of translucent material filled with flakes of a second different material.

7. The seal of claim 5 wherein the means for providing the body with a spotted appearance includes forming the body with aluminum flakes imbedded therein and of such material so the aluminum flakes are visible to an extent external said body.

8. The seal of claim 4 wherein said weakened regions have a star shaped periphery said radially extending ridges terminating at the points of the star and said grooves terminating at the troughs of the star.

9. The seal of claim 8 wherein body is circular in transverse dimension and having a longitudinal axis, the crests of the ridges and the roots of the grooves defining radially extending lines emanating from said axis.

10. The seal of claim 9 wherein the crests and roots of the grooves emanate from a common point, the crests lying in a first conical surface of revolution and the roots lying in a second conical surface of revolution.

11. The seal of claim 10 wherein the top wall has an external top surface that is convex.

12. The seal of claim 1 wherein said peripheral side wall has a circular external peripheral surface which is a segment of a cone wherein the side wall has its smallest peripheral diameter at one end thereof.

13. An aperture seal for providing tamper evidence indicating access to a cylindrical aperture lying on a longitudinal axis, said aperture having an interior side wall, said seal comprising:
   a cylindrical molded frangible thermoplastic body having a top wall and a peripheral side wall dimensioned to be received in said aperture in an axial direction; and
   means adapted to frictionally retain the body in said aperture;
   said top wall being dimensioned with said side wall for enclosing said aperture, said body comprising frangible means such that the body including said top and side walls breaks into a plurality of pieces in response to a localized pressure thereon.

14. The seal of claim 13 wherein the frangible means comprises a plurality of weakening means formed in said top and peripheral side walls.

15. The seal of claim 14 wherein the weakening means comprises a plurality of grooves and ridges formed in said top wall.

16. The seal of claim 15 wherein the grooves and ridges emanate from a common point in said top wall.

17. An aperture seal for providing tamper evidence indicating access to a circular cylindrical aperture lying on a longitudinal axis, said aperture having an interior side wall, said seal comprising:
   a molded thermoplastic frangible hollow cylindrical body having a top wall and a peripheral side wall dimensioned to be received in said aperture in an axial direction such that the top wall is in communication with the ambient atmosphere when received, said body including means adapted such that the body is frictionally retained in the aperture and
   a plurality of weakening means in said body responsive to a local pressure induced force for fracturing the body into a plurality of pieces which are substantially free of said frictional retention in said aperture.

18. The seal of claim 17 wherein the aperture side wall includes one of a mating groove and ridge said peripheral side wall including the other of said groove and ridge for inhibiting removal of said body from said aperture in a direction opposite said axial direction.

19. The seal of claim 17 including forming the body or molded thermoplastic material containing metallic flakes such that the flakes are visibly distinguishable external said body.

20. An aperture seal for providing tamper evidence indicating access to a cylindrical aperture of a given transverse shape and axial extent, said aperture having an interior side wall, said seal comprising:
   a cylindrical body having a peripheral side wall of said given transverse shape dimensioned to be received in and frictionally retained in said aperture in an axial direction; and
   transverse wall means secured to the body side wall for enclosing said aperture, said body comprising frangible means such that the body breaks into a plurality of pieces in response to a localized pressure;

said body having a hollow core forming the body into a cup shaped member comprising a side wall extending in an axial direction, said transverse wall means comprising a top wall at an edge of the body side wall and transverse the axial direction, said body comprising frangible material and further comprising a plurality of weakened regions in at least the top wall, wherein the weakened regions include radially extending ridges and grooves in said top wall.

21. An aperture seal for providing tamper evidence indicating access to a cylindrical aperture of a given transverse shape and axial extent, said aperture having an interior side wall, said seal comprising:
- a cylindrical body having a peripheral side wall of said given transverse shape dimensioned to be received in and frictionally retained in said aperture in an axial direction; and
- transverse wall means secured to the body side wall for enclosing said aperture, said body comprising frangible means such that the body breaks into a plurality of pieces in response to a localized pressure, said body being formed of molded thermoplastic including means for providing the body with a spotted appearance.

22. The seal of claim 21 wherein the means for providing the body with a spotted appearance includes providing the body with aluminum flakes imbedded therein and of such material so that aluminum flakes are visible to an extent external said body.

23. An aperture seal for providing tamper evidence indicating access to a cylindrical aperture of a given transverse shape and axial extent, said aperture having an interior side wall, said seal comprising:
- a cylindrical body having a peripheral side wall of said given transverse shape dimensioned to be received in and frictionally retained in said aperture in an axial direction; and
- transverse wall means secured to the body side wall for enclosing said aperture, said body comprising frangible means such that the body breaks into a plurality of pieces in response to a localized pressure, said peripheral side wall having an external peripheral surface which is a segment of a cone wherein the side wall has its smallest peripheral diameter at one end thereof.

24. An aperture seal for providing tamper evidence indicating access to a cylindrical aperture lying on a longitudinal axis, said aperture having an interior side wall, said seal comprising:
- a cylindrical body having a top wall and a peripheral side wall dimensioned to be received in said aperture in an axial direction; and
- means adapted to frictionally retain the body in said aperture;
- said top wall being dimensioned with said side wall for enclosing said aperture, said body comprising frangible means such that the body including said top and peripheral side walls breaks into a plurality of pieces in response to a localized pressure thereon, said frangible means comprising a plurality of weakening means in said top and peripheral side walls, said weakening means further comprising a plurality of grooves and ridges in said top wall.

* * * * *

UNITED STATES PATENT AND TRADEMARK OFFICE
CERTIFICATE OF CORRECTION

PATENT NO. : 5,306,054
DATED : Apr. 26, 1994
INVENTOR(S) : George Georgopoulos

It is certified that error appears in the above-indentified patent and that said Letters Patent is hereby corrected as shown below:

```
Col. 1, line 31, after "wall", insert "of".

Col. 3, line 23, change "ember" to "member".
Claim 2, line 1, change "3" to "1".
```

Signed and Sealed this

Sixth Day of September, 1994

BRUCE LEHMAN

Attest:

*Attesting Officer*     *Commissioner of Patents and Trademarks*